United States Patent
Chou et al.

(10) Patent No.: US 12,012,682 B2
(45) Date of Patent: Jun. 18, 2024

(54) BREATHABLE WATER RESISTANT FILM

(71) Applicant: TAIWAN TEXTILE RESEARCH INSTITUTE, New Taipei (TW)

(72) Inventors: Hsin-Ying Chou, New Taipei (TW); Haw-Jer Chang, New Taipei (TW)

(73) Assignee: TAIWAN TEXTILE RESEARCH INSTITUTE, New Taipei (TW)

( * ) Notice: Subject to any disclaimer, the term of this patent is extended or adjusted under 35 U.S.C. 154(b) by 1 day.

(21) Appl. No.: 17/722,450

(22) Filed: Apr. 18, 2022

(65) Prior Publication Data

US 2023/0175179 A1  Jun. 8, 2023

(30) Foreign Application Priority Data

Dec. 7, 2021 (TW) .................. 110145710

(51) Int. Cl.

| | | |
|---|---|---|
| *D04H 1/728* | (2012.01) | |
| *B32B 5/02* | (2006.01) | |
| *D01F 1/10* | (2006.01) | |
| *D01F 6/80* | (2006.01) | |
| *D04H 1/4334* | (2012.01) | |
| *D04H 1/4382* | (2012.01) | |

(52) U.S. Cl.
CPC ............. *D04H 1/728* (2013.01); *B32B 5/022* (2013.01); *D01F 1/10* (2013.01); *D01F 6/80* (2013.01); *D04H 1/4334* (2013.01); *D04H 1/43838* (2020.05); *B32B 2307/724* (2013.01); *B32B 2307/73* (2013.01)

(58) Field of Classification Search
CPC .............. D04H 1/728; D04H 1/4334; D04H 1/43838; D01D 5/0084; D01F 1/10; D01F 6/80; B32B 2250/02; B32B 2250/20; B32B 2262/0261; B32B 2307/724; B32B 2307/728; B32B 2437/00; B32B 5/275; B32B 5/022; B32B 27/34; B32B 27/12; B32B 27/32; B32B 27/36
See application file for complete search history.

(56) References Cited

U.S. PATENT DOCUMENTS

| | | | |
|---|---|---|---|
| 7,318,853 B2 | 1/2008 | Chung et al. | |
| 7,622,157 B2 | 11/2009 | Falk et al. | |
| 8,329,830 B2 | 12/2012 | Yang et al. | |
| 10,035,812 B2 | 7/2018 | Yamane et al. | |
| 2007/0283808 A1* | 12/2007 | Chung | D01D 5/003 55/528 |
| 2010/0015453 A1* | 1/2010 | Yamaguchi | C08G 65/3255 428/428 |
| 2011/0274906 A1* | 11/2011 | Kim | C01B 32/977 977/842 |
| 2014/0147680 A1* | 5/2014 | Yamane | C07F 7/10 428/428 |

FOREIGN PATENT DOCUMENTS

| | | | | |
|---|---|---|---|---|
| CN | 107587268 A | * | 1/2018 | |
| EP | 1366791 A1 | * | 12/2003 | ........... B01D 39/163 |
| KR | 101479750 B1 | | 1/2015 | |
| TW | I672346 B | | 9/2019 | |
| WO | 2011035195 A1 | | 3/2011 | |

OTHER PUBLICATIONS

U.S. Appl. No. 17/541,348, filed Dec. 3, 2021.

* cited by examiner

*Primary Examiner* — Jennifer A Gillett

(74) *Attorney, Agent, or Firm* — McClure, Qualey & Rodack, LLP

(57) ABSTRACT

A breathable water resistant film provided by the present disclosure includes a base cloth and a nanofiber layer disposed on the base cloth, wherein the nanofiber layer is formed by an electrospinning solution including a first additive and a second additive. The first additive includes a nylon copolymer and an alcohol, and the second additive includes a polysilazane resin and a perfluoropolyether-modified polysilazane resin.

17 Claims, No Drawings

BREATHABLE WATER RESISTANT FILM

CROSS-REFERENCE TO RELATED APPLICATION

This application claims priority to Taiwan Application Serial Number 110145710, filed on Dec. 7, 2021, which is herein incorporated by reference in its entirety.

BACKGROUND

Field of Invention

The present disclosure relates to the breathable water resistant film. More particularly, the present disclosure relates to the breathable water resistant film having nanofibers.

Description of Related Art

In recent years, the development of the textile technology has focused on introducing the new techniques for improving functions of clothing instead of appearance design thereof. The breathable water resistant fabric acting as a functional fabric can release the moisture on the skin of the user's body and prevent the moisture in the environment from penetrating into the fabric, thereby being widely applied in the outdoor casual clothing. However, the prior breathable water resistant fabric still encounters the difficulty in poor flexibility and air permeability. Therefore, how to provide high water resistance to the fabric with advanced flexibility and air permeability is an important issue for the functional fabric.

SUMMARY

An aspect of the present disclosure relates in general to a breathable water resistant film, which is suitable for applying on fabrics to provide the fabrics with high air permeability, high water resistance, and high flexibility.

According to some embodiments of the present disclosure, the breathable water resistant film includes a base cloth and a nanofiber layer disposed on the base cloth, where an electrospinning solution forming the nanofiber layer includes a first additive and a second additive. The first additive includes nylon copolymer and an alcohol, and the second additive includes polysilazane resin and perfluoropolyether-modified polysilazane resin.

In some embodiments of the present disclosure, each 100 parts by weight of the electrospinning solution includes 0.5 parts by weight to 1.5 parts by weight of the perfluoropolyether.

In some embodiments of the present disclosure, each 100 parts by volume of the electrospinning solution includes 10 parts by volume to 20 parts by volume of the second additive.

In some embodiments of the present disclosure, each 100 parts by volume of the electrospinning solution includes 80 parts by volume to 90 parts by volume of the first additive.

In some embodiments of the present disclosure, the first additive includes 5 parts by weight to 15 parts by weight of the nylon copolymer and 85 parts by weight to 95 parts by weight of the alcohol.

In some embodiments of the present disclosure, a solubility of the nylon copolymer in the alcohol is between 5 wt % and 15 wt %.

In some embodiments of the present disclosure, the nylon copolymer includes a copolymer of copolyamide and alkoxy-modified nylon 46/66 copolymer.

In some embodiments of the present disclosure, a solubility of the second additive in the alcohol is between 0.5 vol % and 20 vol %.

In some embodiments of the present disclosure, a material of the base cloth is nylon, polypropylene, polyvinylpyrrolidone, polyester, or a combination thereof.

In some embodiments of the present disclosure, the nanofiber layer is formed on the base cloth by a needleless electrospinning process.

In some embodiments of the present disclosure, an average pore size of the nanofiber layer is between 100 nm and 1000 nm.

In some embodiments of the present disclosure, an average fiber fineness of nanofibers in the nanofiber layer is between 100 nm and 500 nm.

In some embodiments of the present disclosure, a basis weight of the nanofiber layer is between 3 gsm and 20 gsm.

In some embodiments of the present disclosure, the alcohol includes ethanol.

In some embodiments of the present disclosure, the polysilazane resin and the perfluoropolyether-modified polysilazane resin have the same polymer backbone chain.

In some embodiments of the present disclosure, a water resistance of the breathable water resistant film is between 4000 $mmH_2O$ and 22000 $mmH_2O$.

In some embodiments of the present disclosure, a contact angle of water droplet of the breathable water resistant film is between 130° and 150°.

In some embodiments of the present disclosure, an air permeability of the breathable water resistant film is between 0.6 cfm and 10 cfm.

In some embodiments of the present disclosure, a fiber strength of the nanofiber layer is between 0.1 kgf and 1 kgf.

In some embodiments of the present disclosure, a fiber elongation of the nanofiber layer is between 20% and 130%.

In the aforementioned embodiments of the present disclosure, the breathable water resistant film of the present disclosure includes the nanofiber layer, and the electrospinning solution forming the nanofiber layer includes the first additive and the second additive. The first additive includes the nylon copolymer and the alcohol, while the second additive includes the polysilazane resin and the perfluoropolyether-modified polysilazane resin. Therefore, the breathable water resistant film of the present disclosure has high air permeability, water resistance, and flexibility, thereby being able to be applied to the field related to the breathable water resistant fabrics.

DETAILED DESCRIPTION

The following disclosure provides many different embodiments, or examples, for implementing different features of the provided subject matter. Specific examples of components, values, arrangements, etc., are described below to simplify the present disclosure. These are, of course, merely examples and are not intended to be limiting.

The present disclosure provides a breathable water resistant film including a base cloth and a nanofiber layer disposed on the base cloth. The electrospinning solution used to form the nanofiber layer includes a first additive and a second additive, in which the first additive includes nylon copolymer and an alcohol, and the second additive includes polysilazane resin and perfluoropolyether-modified polysilazane resin. Since the electrospinning solution forming the nanofiber layer includes the perfluoropolyether-modified polysilazane resin, the nanofiber layer formed by the electrospinning solution has high air permeability and hydrophobicity, as well as high fiber strength and fiber elongation. Therefore, the breathable water resistant film of the present disclosure has good air permeability, water resistance, and flexibility.

According to some embodiments of the present disclosure, a breathable water resistant film including a base cloth and a nanofiber layer disposed on the base cloth is provided. Specifically, nanofibers are disposed on a surface of the base cloth by an electrospinning process using an electrospinning solution. As a result, the stagger arranged nanofibers form the nanofiber layer that provides high air permeability, water resistance, and flexibility for the breathable water resistant film. More specifically, the electrospinning solution forming the nanofiber layer includes a first additive and a second additive. The first additive includes nylon copolymer and an alcohol, leading to the electrospinning solution with high spinnability. Furthermore, the second additive includes polysilazane resin and perfluoropolyether-modified polysilazane resin so that the nanofiber layer has high hydrophobicity, fiber strength, and fiber elongation.

In some embodiments, the nylon copolymer in the first additive may be used to form the base material of the nanofibers in the nanofiber layer. As the nylon copolymer with high abrasion resistance is used as the base material of the nanofibers, the nanofiber layer can resist abrasion such that the breathable water resistant film is suitable for outdoor functional clothing. In some embodiments, the alcohol in the first additive may be the solvent for other substances of the electrospinning solution so that the electrospinning solution is suitable for the electrospinning process such as needleless electrospinning. This allows the nanofiber layer to be formed on the base cloth at a high-speed. For example, the alcohol in the first additive may include ethanol. In addition, the alcohol in the first additive also has advantages such as high volatility, low toxicity, and low corrosiveness, leading to the ecofriendly electrospinning solution.

In some embodiments, the first additive in the electrospinning solution may include appropriate amount of the nylon copolymer and the alcohol so that the electrospinning solution has high spinnability. For example, the first additive may include 5 parts by weight to 15 parts by weight of the nylon copolymer and 85 parts by weight to 95 parts by weight of the alcohol. As a result, the nanofibers formed by the electrospinning process using the electrospinning solution would have superfine fiber fineness, and the nanofibers may be arranged as the nanofiber layer with suitable pore size. Since the nanofiber layer formed by the electrospinning solution has superfine fiber fineness and suitable pore size, the nanofiber layer can be highly air permeable. In some embodiments, a solubility of the nylon copolymer in the first additive may be high in the alcohol so that the nylon copolymer and the alcohol can easily form the uniform first additive. For example, the solubility of the nylon copolymer in the alcohol may be between 5 wt % and 15 wt %. In some embodiments, the nylon copolymer may include a copolymer of copolyamide and alkoxy-modified nylon 46/66 copolymer so that the nylon copolymer is highly soluble in the alcohol and thereby provides the electrospinning solution with high spinnability.

In some embodiments, the polysilazane resin and the perfluoropolyether-modified polysilazane resin in the second additive may be used for the hydrophobic modification of the nanofiber layer so that the breathable water resistant film is provided with high water resistance. Specifically, the perfluoropolyether-modified polysilazane resin is obtained by modifying the polysilazane resin with perfluoropolyether. In other words, the polysilazane resin and the perfluoropolyether-modified polysilazane resin have the same polymer backbone chain. The polysilazane resin and the perfluoropolyether-modified polysilazane resin are hydrophobic enough to perform the hydrophobic modification of the nanofibers formed by the electrospinning, thereby providing the nanofiber layer with high hydrophobicity and further providing the breathable water resistant film with high water resistance. Moreover, as the second additive includes the polysilazane resin and the perfluoropolyether-modified polysilazane resin, the nanofiber layer may be provided with additional advantageous. For example, the second additive may enhance the fiber strength and the fiber elongation of the nanofiber so that the nanofiber layer has high flexibility to improve the flexibility and processability of the breathable water resistant film. In addition, the second additive may reduce the undesired adhesion of the electrospinning solution during the electrospinning process, which prevents the electrospinning solution from gelatination. This improves the spinnability of the electrospinning solution and the production efficiency of the breathable water resistant film.

In some embodiments, the second additive in the electrospinning solution may include appropriate amount of the polysilazane resin and the perfluoropolyether-modified polysilazane resin such that the electrospinning solution includes appropriate amount of the perfluoropolyether to provide the nanofiber layer with high water resistance and flexibility. For example, the perfluoropolyether and the polysilazane resin may be first mixed to modify a portion of the polysilazane resin with the perfluoropolyether, thereby forming the second additive including the polysilazane resin and the perfluoropolyether-modified polysilazane resin. Then, the electrospinning solution is formed by mixing the second additive and the first additive such that each 100 parts by weight of the electrospinning solution includes 0.5 parts by weight to 1.5 parts by weight of the perfluoropolyether. If each 100 parts by weight of the electrospinning solution includes more than 1.5 parts by weight of the perfluoropolyether, the adhesion of the nanofiber layer to the base cloth or the pore size of the nanofiber layer may be reduced. This adversely impacts the washability or the air permeability of the breathable water resistant film. If each 100 parts by weight of the electrospinning solution includes less than 0.5 parts by weight of the perfluoropolyether, the perfluoropolyether may be too less to provide the water resistance, fiber strength, and fiber elongation of the nanofiber layer. In some embodiments, a solubility of the second additive may be high in the alcohol of the first additive so that the second additive forms the uniform electrospinning solution with the first additive. For example, the solubility of the second additive in the alcohol of the first additive may be between 0.5 vol % and 20 vol %, thereby providing the electrospinning solution with high spinnability.

In some embodiments, the electrospinning solution forming the nanofiber layer may include appropriate amount of the second additive so that the nanofiber layer formed by the electrospinning solution has high water resistance, fiber strength, and fiber elongation. For example, each 100 parts by volume of the electrospinning solution may include 10 parts by volume to 20 parts by volume of the second additive. In one embodiment, each 100 parts by volume of the electrospinning solution may include 80 parts by volume to 90 parts by volume of the first additive and 10 parts by volume to 20 parts by volume of the second additive, thereby proving the nanofiber layer with high air permeability, water resistance, and flexibility.

As mentioned above, the nanofiber layer formed by the electrospinning solution including the first additive and the second additive may provide advantageous of the breathable water resistant film. In some embodiments, the nanofiber layer may be highly water resistant to provide the breathable water resistant film with high water resistance and large contact angle of water droplet. For example, the water resistance of the breathable water resistant film may be between 4000 mmH$_2$O and 22000 mmH$_2$O, and the contact angle of water droplet of the breathable water resistant film may be between 130° and 150°. In some embodiments, the nanofiber layer may have superfine fiber fineness and suitable pore size so that the breathable water resistant film has high air permeability. For example, the average fiber fineness of the nanofibers in the nanofiber layer may be between 100 nm and 500 nm, and the average pore size of the nanofiber layer may be between 100 nm and 1000 nm, thereby providing the nanofiber layer with high air permeability. In some embodiments, the air permeability of the breathable water resistant film may be between 0.6 cfm (cubic feet per minute) and 10 cfm.

In some embodiments, the nanofiber layer may have high fiber strength and high fiber elongation. This allows the nanofiber layer to be conformal with various kinds of the base cloth, which further provides the breathable water resistant film with high flexibility. For example, the fiber strength of the nanofiber layer may be between 0.1 kgf and 1 kgf, and the fiber elongation of the nanofiber layer may be between 20% and 130%. In some embodiments, the base cloth of the breathable water resistant film may be woven fabric or non-woven fabric, in which the material of the base cloth may be nylon, polypropylene, polyvinylpyrrolidone, polyester, or a combination thereof. Since the nanofiber layer may be disposed on various kinds of the base cloth, the breathable water resistant film can be applied in diverse wearing clothing, for example, outdoor casual clothing. In some embodiments, the nanofiber layer may have low basis weight so that the breathable water resistant film shows good softness. For example, the basis weight of the nanofiber layer may be between 3 gsm (gram per square meter) and 20 gsm, thereby improving the wearing comfort of the breathable water resistant film. In some preferred embodiments, the basis weight of the nanofiber layer may be between 5 gsm and 20 gsm.

In the following descriptions, a variety of measurements and evaluations were performed for the breathable water resistant film of the present disclosure to specifically describe the advantageous of the present disclosure. First, the electrospinning solution of each comparative example and example was formed according to the components and contents shown in Table 1. The nanofiber layers having the same film thickness were then formed on the nylon base cloth by the same electrospinning process to obtain the nylon film of each comparative example and the breathable water resistant film of each example. It should be understood that the types and the properties of the first additive, the second additive, and the electrospinning solution are described in the aforementioned contents.

TABLE 1

|  | First additive | Second additive | Perfluoropolyether |
|---|---|---|---|
| Example 1 | 88 | 12 | 1.2 |
| Example 2 | 90 | 10 | 1 |

TABLE 1-continued

|  | First additive | Second additive | Perfluoropolyether |
|---|---|---|---|
| Comparative example 1 | 100 | 0 | 0 |
| Comparative example 2 | 80 | 20 | 0 |

Remark 1: unit for the first additive and the second additive is parts by volume
Remark 2: unit for the perfluoropolyether is parts by weight and is count by 100 parts by weight of the electrospinning solution Then, the water resistance evaluation was performed for the nylon film of each comparative example and the breathable water resistant film of each example. Specifically, the water resistance of each comparative example and each example was measured by using the standard method CNS 10460 L3201, and the contact angle of water droplet of each comparative example and each example was observed by the microscope. In addition, the air permeability evaluation was performed for the nylon film of each comparative example and the breathable water resistant film of each example. Specifically, the air permeability of each comparative example and each example was measured by using the standard method ASTM D737. The results of each comparative example and each example are shown in Table 2.

Furthermore, the flexibility evaluation was performed for the nanofiber layer of each comparative example and example. Specifically, the fiber strength and the fiber elongation of the nanofiber layer of each comparative example and each example were measured by using the standard method ASTM D5035. The results of each comparative example and each example are shown in Table 2.

TABLE 2

|  | Water resistance (mmH$_2$O) | Contact angle of water droplet (°) | Air permeability (CFM) | Fiber strength (kgf) | Fiber elongation (%) |
|---|---|---|---|---|---|
| Example 1 | 7850 | 135 | 1.26 | 0.82 | 97.65 |
| Example 2 | 7380 | 132 | 1.64 | 0.75 | 90.32 |
| Comparative example 1 | N/A | <<90 | 1.64 | N/A | N/A |
| Comparative example 2 | 4590 | 129 | 1.32 | 0.68 | 57.32 |

As seen from Table 2, the electrospinning solution forming the comparative example 1 does not include the second additive. As a result, the water resistance of the nylon film of the comparative example 1 is too low to be measured, and the nylon film of the comparative example 1 shows very small contact angle of water droplet. This indicates that the comparative example 1 could not resist water. Similarly, the electrospinning solution forming the comparative example 2 does not include the perfluoropolyether-modified polysilazane resin such that the nylon film of the comparative example 2 shows lower water resistance and smaller contact angle of water droplet. In contrast, the breathable water resistant films of the example 1 and example 2 obviously show higher water resistance and larger contact angle of water droplet, which indicates that the electrospinning solution with the perfluoropolyether-modified polysilazane resin provides the breathable water resistant film with high water resistance. Additionally, the air permeability of the breathable water resistant films of the example 1 and example 2 are both higher than 1.0 cfm, which shows that the breathable water resistant films of the examples have good air permeability. Therefore, the breathable water resistant films meet the industry requirements and are suitable for various functional clothing.

Moreover, the electrospinning solution forming the comparative example 1 does not include the second additive such that the flexibility of the nanofiber layer of the comparative example 1 is too low to measure its fiber strength and fiber elongation. In addition, comparing the example 1 and example 2 with the comparative example 2, the nanofiber layers of the example 1 and example 2 show higher fiber strength and higher fiber elongation. Therefore, the electrospinning solution including the perfluoropolyether-modified polysilazane resin provides the nanofiber layer with high fiber strength and high fiber elongation, leading to the breathable water resistant film with high flexibility.

According to the aforementioned embodiments of the present disclosure, the breathable water resistant film of the present disclosure includes the base cloth and the nanofiber layer, in which the electrospinning solution forming the nanofiber layer includes appropriate amount of the first additive and the second additive. Since the first additive includes the nylon copolymer and the alcohol, the nanofiber layer formed by the electrospinning solution has high air permeability. Additionally, the second additive includes the polysilazane resin and the perfluoropolyether-modified polysilazane resin so that the nanofiber layer has high water resistance, high fiber strength, and high fiber elongation. Therefore, the breathable water resistant film of the present disclosure has good air permeability, water resistance, and flexibility, thereby increasing the applicability of the breathable water resistant film.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A breathable water resistant film, comprising:
   a base cloth; and a
   nanofiber layer disposed on the base cloth, wherein a fiber elongation of the nanofiber layer is between 90% and 130%,
   wherein an electrospinning solution forming the nanofiber layer comprises:
   a first additive comprising a nylon copolymer and an alcohol; and
   a second additive comprising a polysilazane resin and a perfluoropolyether-modified polysilazane resin, wherein the perfluoropolyether-modified polysilazane resin has a polymer backbone chain of the polysilazane resin modified by a perfluoropolyether, and
   wherein the nylon copolymer, the polysilazane resin, and the perfluoropolyether-modified polysilazane resin are dissolved in the alcohol to form the electrospinning solution,
   wherein a contact angle of water droplet of the breathable water resistant film is between 130° and 150°.

2. The breathable water resistant film of claim 1, wherein each 100 parts by weight of the electrospinning solution comprises 0.5 parts by weight to 1.5 parts by weight of the perfluoropolyether.

3. The breathable water resistant film of claim 1, wherein each 100 parts by volume of the electrospinning solution comprises 10 parts by volume to 20 parts by volume of the second additive.

4. The breathable water resistant film of claim 3, wherein the each 100 parts by volume of the electrospinning solution comprises 80 parts by volume to 90 parts by volume of the first additive.

5. The breathable water resistant film of claim 1, wherein the first additive comprises 5 parts by weight to 15 parts by weight of the nylon copolymer and 85 parts by weight to 95 parts by weight of the alcohol.

6. The breathable water resistant film of claim 1, wherein a solubility of the nylon copolymer in the alcohol is between 5 wt % and 15 wt %.

7. The breathable water resistant film of claim 1, wherein the nylon copolymer comprises a copolymer of a first polymer and a second polymer, the first polymer is a copolyamide, and the second polymer is an alkoxy-modified nylon 46/66 copolymer.

8. The breathable water resistant film of claim 1, wherein a solubility of the second additive in the alcohol is between 0.5 vol % and 20 vol %.

9. The breathable water resistant film of claim 1, wherein a material of the base cloth is nylon, polypropylene, polyvinylpyrrolidone, polyester, or a combination thereof.

10. The breathable water resistant film of claim 1, wherein the nanofiber layer is formed on the base cloth by a needleless electrospinning process.

11. The breathable water resistant film of claim 1, wherein an average pore size of the nanofiber layer is between 100 nm and 1000 nm.

12. The breathable water resistant film of claim 1, wherein an average fiber fineness of nanofibers in the nanofiber layer is between 100 nm and 500 nm.

13. The breathable water resistant film of claim 1, wherein a basis weight of the nanofiber layer is between 3 gsm and 20 gsm.

14. The breathable water resistant film of claim 1, wherein the alcohol comprises ethanol.

15. The breathable water resistant film of claim 1, wherein a water resistance of the breathable water resistant film is between 4000 mmH$_2$O and 22000 mmH$_2$O.

16. The breathable water resistant film of claim 1, wherein an air permeability of the breathable water resistant film is between 0.6 cfm and 10 cfm.

17. The breathable water resistant film of claim 1, wherein a fiber strength of the nanofiber layer is between 0.1 kgf and 1 kgf.

* * * * *